United States Patent
Hennegan

(10) Patent No.: US 9,400,322 B2
(45) Date of Patent: Jul. 26, 2016

(54) METHODS AND APPARATUS FOR SIGNAL SIDEBAND RECEIVER/TRANSCEIVER FOR PHASED ARRAY RADAR ANTENNA

(71) Applicant: Raytheon Company, Waltham, MA (US)

(72) Inventor: Richard Hennegan, Torrance, CA (US)

(73) Assignee: Raytheon Company, Waltham, MA (US)

( * ) Notice: Subject to any disclaimer, the term of this patent is extended or adjusted under 35 U.S.C. 154(b) by 340 days.

(21) Appl. No.: 14/077,486

(22) Filed: Nov. 12, 2013

(65) Prior Publication Data

US 2015/0130658 A1 May 14, 2015

(51) Int. Cl.
*G01S 7/28* (2006.01)
*G01S 7/03* (2006.01)
*G01S 7/282* (2006.01)

(52) U.S. Cl.
CPC *G01S 7/032* (2013.01); *G01S 7/282* (2013.01)

(58) Field of Classification Search
CPC ................................. G01S 7/032; G01S 7/282
USPC ........................................................ 342/175
See application file for complete search history.

(56) References Cited

U.S. PATENT DOCUMENTS

| 4,817,201 | A | | 3/1989 | Bonato | |
|---|---|---|---|---|---|
| 4,931,799 | A | * | 6/1990 | Wen | G01S 7/026 342/110 |
| 6,054,948 | A | * | 4/2000 | Dean | G01S 7/032 342/372 |
| 6,441,783 | B1 | * | 8/2002 | Dean | G01S 7/032 342/372 |
| 6,542,724 | B1 | | 4/2003 | Copeland et al. | |
| 2007/0063888 | A1 | | 3/2007 | Jenkins | |
| 2010/0062726 | A1 | | 3/2010 | Zheng et al. | |
| 2015/0130658 | A1 | * | 5/2015 | Hennegan | G01S 7/032 342/175 |

FOREIGN PATENT DOCUMENTS

| WO | WO 9810511 A1 * | 3/1998 | ............. H03D 7/163 |
|---|---|---|---|
| WO | WO 9810524 A1 * | 3/1998 | ............... H04B 1/38 |

OTHER PUBLICATIONS

Long, J.R., "A low-voltage 5.1-5.8-GHz image-reject downconverter RF IC," in Solid-State Circuits, IEEE Journal of, vol. 35, No. 9, pp. 1320-1328, Sep. 2000.*
Notification of Transmittal of the International Search Report and the Written Opinion of the International Searching Authority, or the Declaration, PCT/US2014/046942, date of mailing Apr. 2, 2015, 5 pages.
Written Opinion of the International Searching Authority, PCT/US2014/046942, date of mailing Apr. 2, 2015, 8 pages.

(Continued)

*Primary Examiner* — John B Sotomayor
(74) *Attorney, Agent, or Firm* — Daly, Crowley, Mofford & Durkee, LLP

(57) ABSTRACT

Methods and apparatus for a receiver having a single sideband mixer with all pass networks to remove unwanted sidebands down conversion of signals. In exemplary embodiments, a single chip receive/transceiver can be used in phased array radars. Since the need for bulky off-chip switch filter banks is eliminated, the number of chips for phased array antenna elements can be increased.

20 Claims, 7 Drawing Sheets

(56) References Cited

OTHER PUBLICATIONS

Maligeorgos J. P. et al.: "A low-voltage 5.1-5.8-GHz image-reject receiver with wide dynamic range", IEEE Journal of Solid-State Circuits, IEEE vol. 35, No. 12, Dec. 1, 2000, pp. 1917-1926, XP011450387, ISSN: 0018-9200. DOI: 10.1109/4.890305, abstract; figures 1,3, p. 1918, left-hand column, paragraph A. RF Filtering and image Rejection—p. 1918, right-hand column, paragraph B. Quadrature Signal Generation.

Ismail W. et al.,: "Low noise integrated active antenna as image reject mixer (IRM)", High Frequency Postgraduate Student Colloquium, 2001. $6^{th}$ IEEE Sep. 9-10, 2001, Piscataway, NJ, USA, IEEE, Sep. 9, 2001, pp. 125-129, XP010565683. ISBN: 978-0-7803-7118-7, abstract; figures 1,2.

Copeland et al: "5-GHz SiGe HBT Monolithic Radio Transceiver with Tunable Filtering", IEEE Transactions on Microwave Theory and Techniques, IEEE Service Center, Piscataway, NJ, US, vol. 48, No. 2, Feb. 1, 2000, XP011037883. ISSN: 0018-9480, abstract; figures 1, 10.

\* cited by examiner

US 9,400,322 B2

METHODS AND APPARATUS FOR SIGNAL SIDEBAND RECEIVER/TRANSCEIVER FOR PHASED ARRAY RADAR ANTENNA

BACKGROUND

As is known in the art, a typical radar transceiver includes three switch filter banks, one for front end interference protection, one for receiver image rejection, and one for transmit image rejection. The switch filter banks require a significant amount of real estate and dominate the size of a single chip transceiver architecture. In conventional configurations, the switch filter banks must be placed off-chip.

FIG. 1 shows a prior art single chip radar transceiver 10 having multiple switch filter banks SFB1, SFB2, SFB2. A first switch filter hank SFB1 provides interference protection, a second switch filter bank SFB2 provides transmit image rejection for the purpose of avoiding the necessity to increase the power of the transmitter amp by 6 dB or more in order to pass both sidebands without distorting the desired sideband, and a third switch filter back SFB3 provides receive image rejection for the purpose of preventing noise figure degradation due to down conversion of the unwanted LNA image noise. As can be seen, the first, second, and third switch filter banks SFB1-3 are off chip due the space required for the filter banks. The challenges of routing signals off and then on chip for signals in the GHz ranges will be readily understood by one of ordinary skill in the art.

SUMMARY

The present invention provides method and apparatus for a radar receiver or transceiver module having single sideband mixer(s) for up and down signal conversion so that only a single switch filter bank is required for front end interference protection, receive image rejection, and transmit image rejection. In exemplary embodiments of the invention, a receiver/transceiver module is implemented on a monolithic integrated circuit or chip to support operation at an exemplary frequency range of about 6 GHz to about 18 GHz. All pass networks, which can be provided on-chip, provide a ninety degree phase shift, for example, over wide bandwidth, e.g., multiple octaves. With this arrangement, relatively small single chip receiver/transceivers can be integrated on a phased array radar antenna, for example. While exemplary embodiments of the invention are shown and described in conjunction with certain embodiments, applications, and components, it is understood that embodiments of the invention are applicable to transceivers in general in which reduced size is desirable. Exemplary embodiments of the invention incorporate single side band conversion to reduce filter space requirements in a monolithic form over broad bandwidths at microwave frequencies (e.g., 6 to 18 GHz).

As will be appreciated by one of ordinary skill in the art, a single chip transceiver implementation is useful in placing transceivers behind antenna elements in a phased array antenna. In a conventional transceiver, three such filters are used: one to reject the image after the up convert mixer, another to reject image noise for the down convert mixer, and another at the front end to protect the LNA from large interferers. In exemplary embodiments of the invention, an on chip broadband image reject implementation includes differential all pass networks that enable the elimination of bulky off-chip switch filter banks for the up convert mixer and the down convert mixer. Because of the smaller size of the resulting transceiver, it is possible to fit more transceivers on the phased array antenna, and thus, increase its capability for such things as simultaneously tracking multiple targets on receive or directing multiple beams at multiple targets at once on transmit.

In exemplary embodiments of the invention, broadband ninety degree all pass networks are used at IF and LO frequencies to provide single sideband up and down converters to eliminate the need for image reject filter banks on the upper/lower side band. Also, undesired image noise is canceled on the receiver side. The differential all pass networks achieve several octaves of bandwidth with relatively accurate ninety degree phase shifts and with little impact on the amplitude response. In addition, for microwave frequency single chip transceivers designed in SiGe are generally differential mode. Thus, the differential all pass networks are well-suited and fit naturally into for wideband monolithic microwave transceivers. In exemplary embodiments, differential all pass network provide a high performance single chip radar transceiver. In one embodiment, a system achieves 3-to-1 bandwidth ratios (e.g., 6 to 18 GHz) in a single sideband converter in a relatively small size.

In one aspect of the invention, a module comprises: a monolithic integrated circuit forming a chip; a low noise amplifier having an output for amplified receive data; a first single sideband mixer disposed on the chip and coupled to the output of the low noise amplifier for downconverting the receive data, the first single sideband mixer comprising: first and second mixers; a first all pass network having an input to receive a local oscillator signal and first and second outputs to generate signals having a first phase difference, the first and second outputs coupled to the first and second mixers; and a second all pass network coupled to the first and second mixers to receive the downconverted receive data.

In another aspect of the invention, a module comprises: amplifier means for low noise amplification of a receive signal; and a first single sideband mixer means for downconverting the receive signal from the amplifier means, the first single sideband mixer means comprising: a first all pass network means for receiving a local oscillator signal and providing a first phase difference; first and second mixer means coupled to the first all pass network means and the amplifier means; and a second all pass network means for receiving the downconverted receive data from the first and second mixer means, wherein the single sideband mixer is disposed on a chip.

In a further aspect of the invention, a method comprises: employing a low noise amplifier having an output for amplified receive data; employing a first single sideband mixer disposed on the chip and coupled to the output of the low noise amplifier for downconverting the receive data, the first single sideband mixer comprising: first and second mixers; a first all pass network having an input, to receive a local oscillator signal and first and second outputs to generate signals having a first phase difference, the first and second outputs coupled to the first and second mixers; and a second all pass network coupled to the first and second mixers to receive the downconverted receive data, wherein the first single sideband mixer is disposed on a chip.

BRIEF DESCRIPTION OF THE DRAWINGS

The foregoing features of this invention, as well as the invention itself, may be more fully understood from the following description of the drawings in which.

DETAILED DESCRIPTION

Exemplary embodiments of the invention provide a receiver only or transceiver as part of a monolithic integrated circuit having single sideband mixer(s) for up and down signal conversion so that only a single switch filter bank is required for front end interference protection, receive image rejection, and transmit image rejection. In exemplary embodiments of the invention, operation at upwards of 6 GHz is provided with ninety degree phase shifts achieved over multiple octaves using all pass networks.

Figure 1:
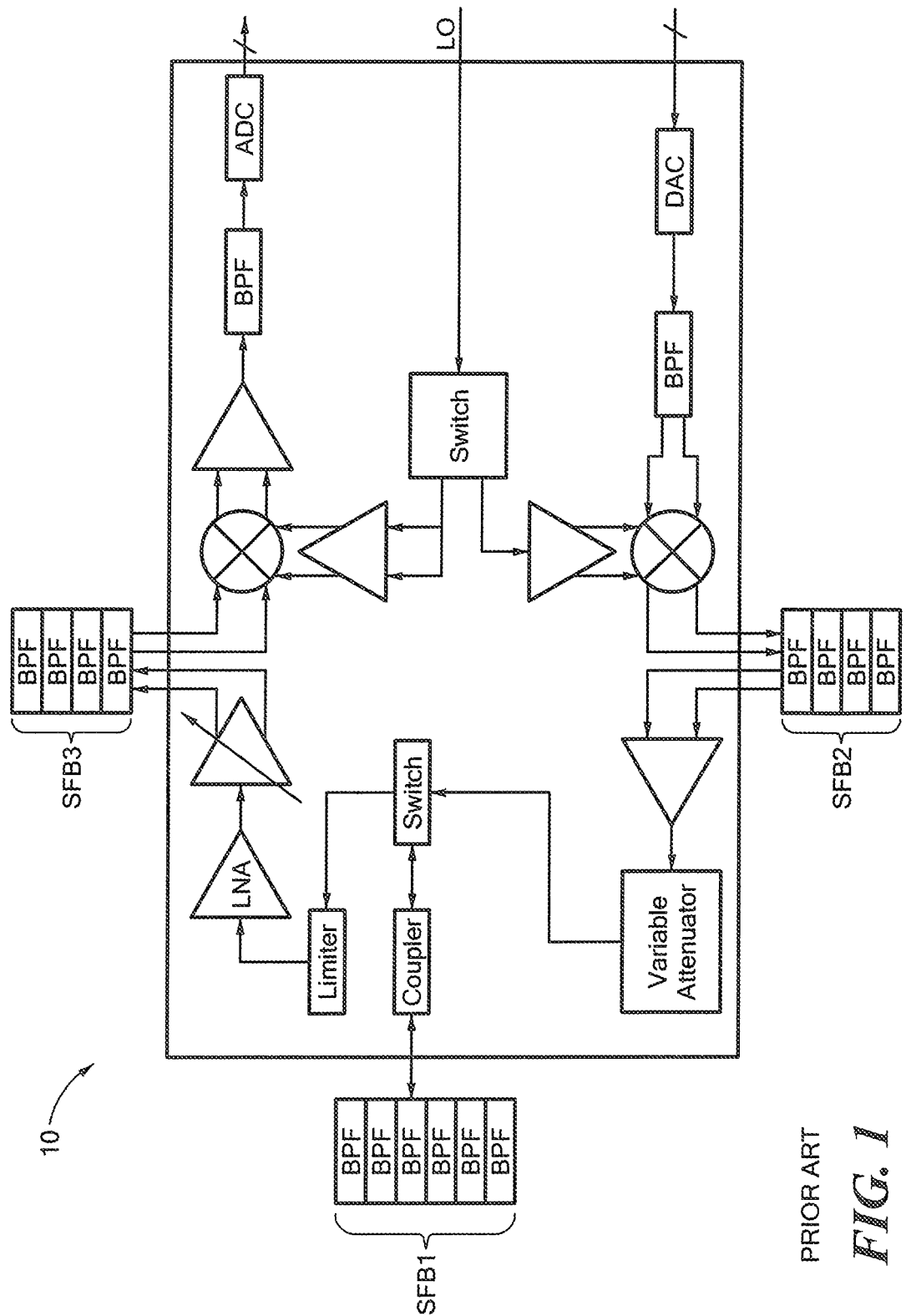
FIG. 1 is a block diagram of a prior art transceiver chip with off-chip switch filter banks.
Figure 2A:
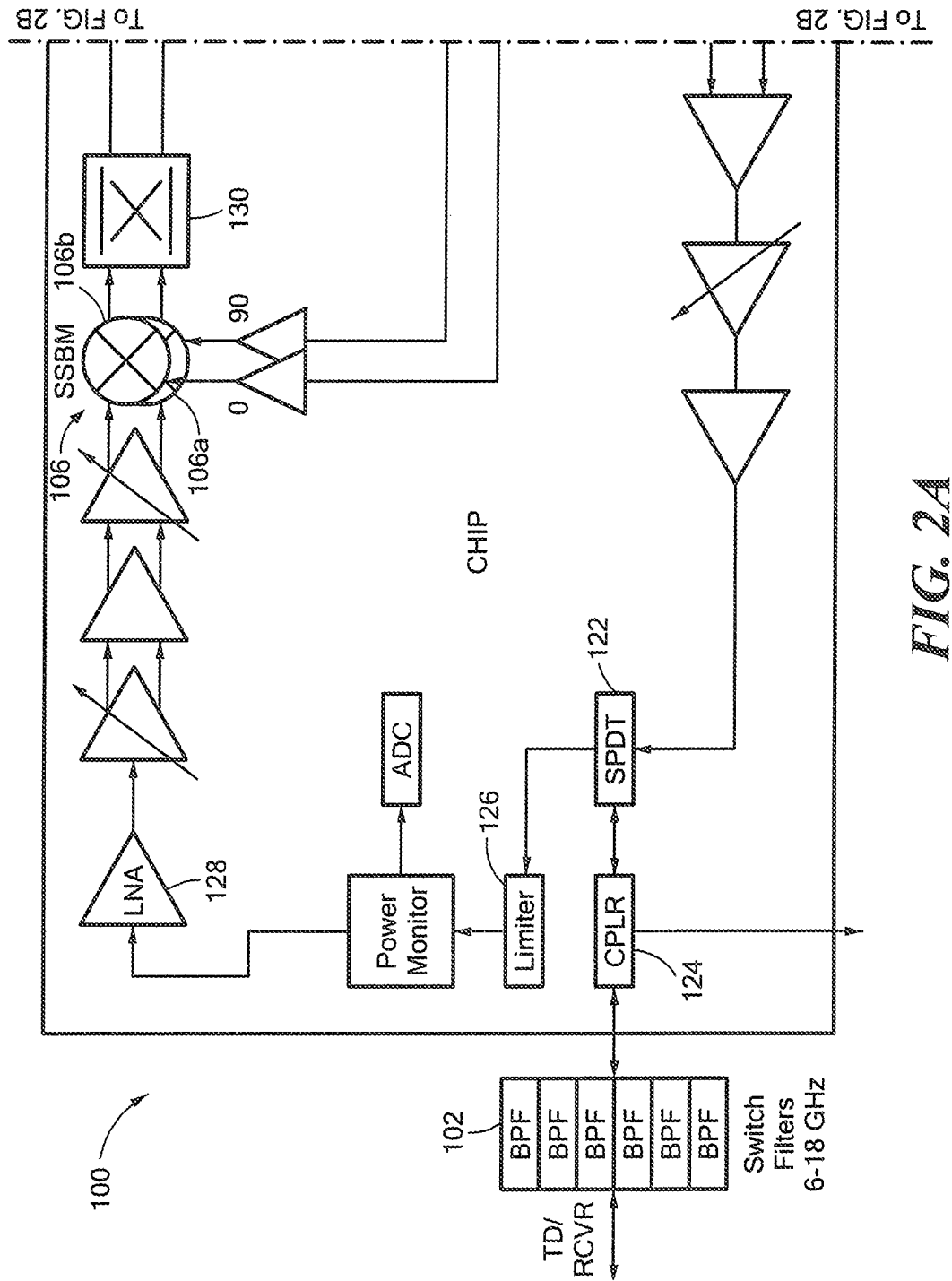
FIG. 2 is a schematic representation of an exemplary transceiver in accordance with exemplary embodiments of the invention.
Figure 2B:
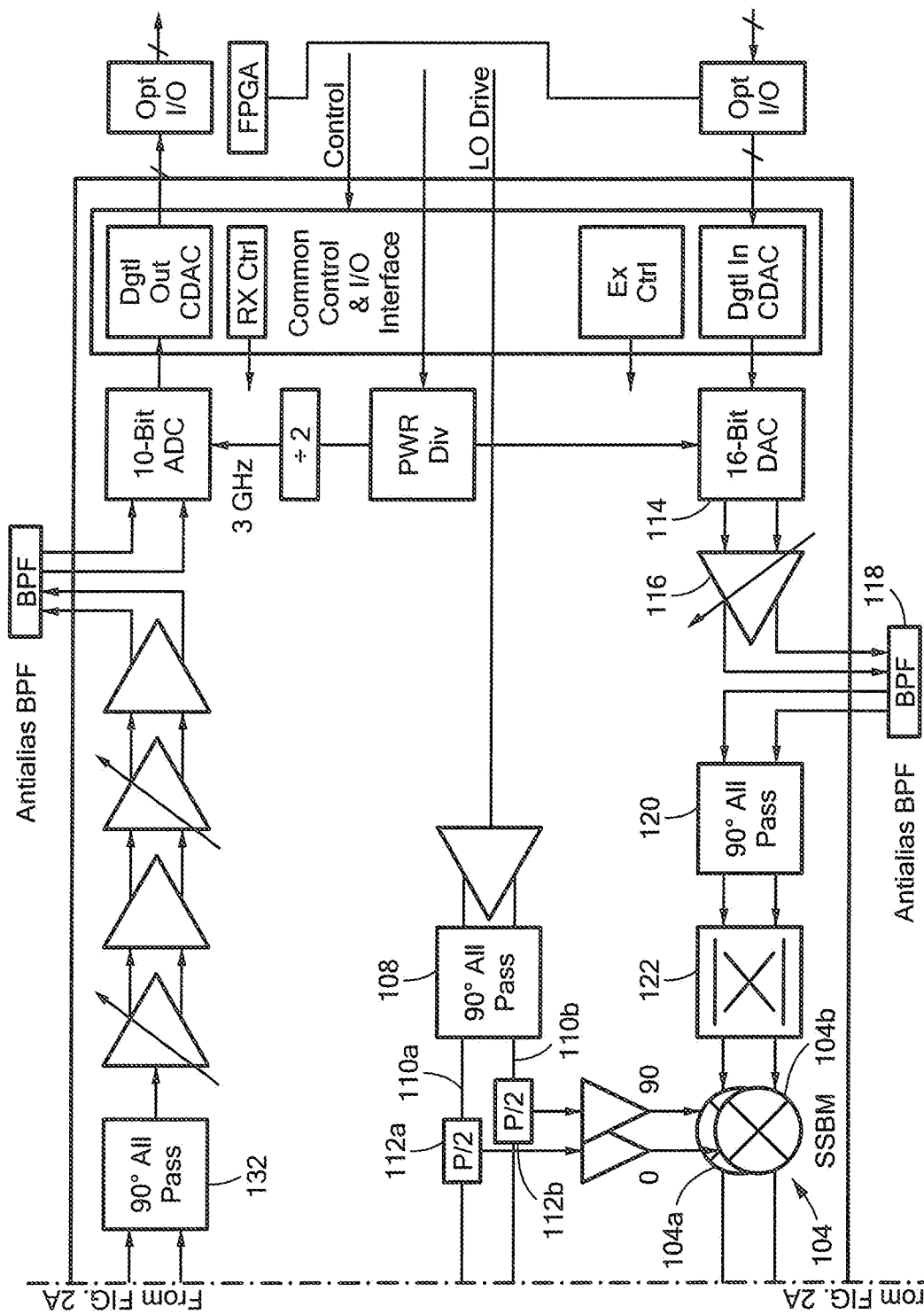

FIG. 2 shows an exemplary transceiver 100 having a single off-chip switch filter bank 102 with first and second single sideband mixers 104, 106 that operate to eliminate the need for bulky off-chip switch filter banks in accordance with exemplary embodiments of the invention. A local oscillator signal LO is provided to a first all pass network 108 having a first output 110a and second output 110b that are ninety degrees out of phase. The all pass network outputs 110 are provided to a splitter 112a,b to enable each output 110a,b to be provided to the first (up convert) and second (down convert) single sideband mixers 104, 106. It is understood that the first single sideband mixer 104 includes the first all pass network 108, second all pass network 120, and first and second mixers 140a, b.

In the transmit path, digital data from an off-chip component is provided to a digital-to-analog converter (DAC) 114 the output of which can be amplified with a variable gain amplifier 116 and band pass filtered 118 as desired, such as for antialiasing. The filtered signal is provided to a second all pass network 120 and then to a cross point switch 122 having outputs coupled to the first (up convert) mixer 104. The cross point switch 122 switches the outputs of the first all pass network 108 to the first single sideband mixer 104 to enable selection of a sideband for cancellation. The 90 degree phase shift for the LO signals provided to the two mixers 104a,b of the SSBM 104 and the 90 degree shift of the IF signals (180 degrees in total) results in cancellation of one of the upper or lower sidebands for the RF signal. It is understood that by cancelling one of the sidebands a relatively constant amplitude envelope signal can be provided to the power amplifier. The RF output of the first mixer 104 is amplified and provided to a switch 122 to enable transmit and receive operations in conjunction with a coupler 124, which is connected to the off-chip switch filter bank 102. Note that the output signal does not require an input port to bring a signal back on-chip from the off-chip switch filter bank, the architecture does not require off-chip connections to switched filter banks as part of signal up/down conversion.

The receive path includes the switch filter bank 102, coupler 124 and switch 122. A limiter 126 is coupled to the switch 122 and to an optional power monitor 126 feeding a low noise amplifier (LNA) 128. The LNA 128 output is amplified to generate a differential signal and provided to the second (down convert) mixer 106 which is provided as a single sideband mixer to reject the image signal. It is understood that the second single sideband mixer 106 includes the first all pass network 108, a third all pass network 132, and third and fourth mixers 106a,b.

In reverse of the transmit upconvert process, LO signals 90 degree of out phase from the first all pass network 108 are provided to the second single sideband mixer 106 along with the RF signal. The mixer 106 outputs are provided to a cross point switch 130 which is coupled to a third pass network 132. With this arrangement, sideband cancellation is achieved in IF as the downconverted signal contains both upper and lower sidebands. The output of the all pass network 132 can be buffered, filtered and digitized for processing in a well known manner. The receive SSBM 106 provides image rejection for preventing noise figure degradation due to down conversion of the unwanted LNA image noise from the canceled signal sideband.

With this arrangement, the first and second mixers 104, 106 in conjunction with the all pass networks 108, 120, 132 eliminate the need for off-chip switch filter banks for image rejection in the up and down signal conversion. A single chip transceiver provides front end interference protection, receive image rejection, and transmit image rejection with a single off-chip switch filter bank 102. Off-chip switch filter banks required in conventional transceivers are replaced with all pass networks, such as ninety degree networks. The space savings in using all pass networks instead of switch filter banks will be readily appreciated by one of ordinary skill in the art.

It is understood that on-chip refers to circuitry formed on a substrate, such as silicon germanium, and off-chip refers to components not on the substrate. In exemplary embodiment, the circuitry is provided as a monolithic integrated circuit. An off-chip component requires an output port to provide a connection from the chip and an input port to provide a connection to the chip. In monolithic transceivers, it is understood that input and output ports for off-chip components are undesirable at high frequencies.

In other embodiments, a receiver is formed on a monolithic integrated circuit and a transmitter is provided using separate circuitry that is well known in the art.

As used herein, an all-pass filter/network refers to a filter that passes a signal in a range of frequencies with minimal amplitude variation and changes the phase relationship of the signals based upon frequency. In general, an all pass network varies signal phase with frequency. The filter can be described by the frequency at which the phase shift crosses ninety degrees, i.e., when the input and output signals achieve a ninety degree relationship over a range of frequencies.

Figure 3:
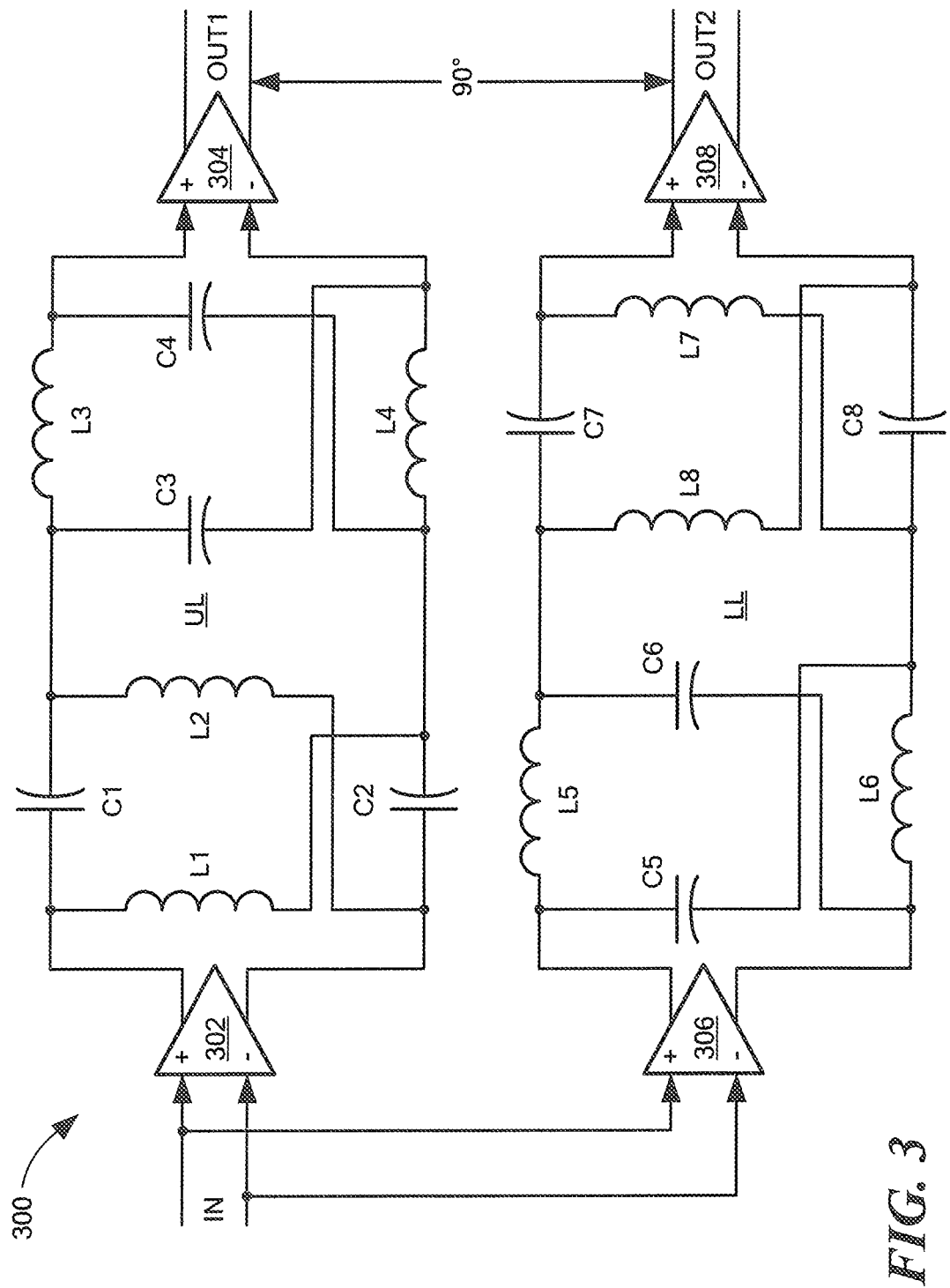
FIG. 3 is an exemplary circuit implementation of an all pass network that can form a part of the transceiver of FIG. 2.

FIG. 3 shows an exemplary implementation of an all pass network 300 hang a phase difference of ninety degrees between outputs OUT1, OUT2 of first and second legs UL, LL of the network. The all pass network 300 includes a network for the first leg UL and a network for the second leg LL that are cascaded. The outputs of a first input differential amplifier 302 are provided to a first leg network of capacitors and inductors coupled to a first output differential amplifier 304. In the illustrated embodiment, a first path extends from a first amplifier output to a first capacitor C1, a third inductor L3, and a first input of the first output differential amplifier 304. A second signal path extends from a second amplifier output to a second capacitor C2, a fourth inductor L4 and a second input of the first output differential amplifier 304. A first inductor L1 has a first terminal coupled to a first terminal of the first capacitor C1 and a second terminal coupled to a second terminal of the second capacitor C2. A second inductor L2 has a first terminal coupled to a second terminal of the first capacitor C2 and a second terminal coupled to a first terminal of the second capacitor C2. Third and fourth capacitors C3, C4 are coupled in a similar manner across the third and fourth inductors L3, L4, as shown. A second network of capacitors and inductors for the second leg LL are coupled as shown between a second input amplifier 306 and a second output amplifier 308. Note that the order of the capacitive and inductive components in the lower network LL is switched with respect to the upper network UL. In operation, for higher frequency signals the impedance of the capacitors tends lower and impedance of the inductors tends higher and vice-versa for lower frequencies.

The illustrated all pass network 300 provides a ninety degree phase differential between outputs within about plus/minus three degrees for a frequency range of about 6-18 GHz for an input impedance of about 50 Ohms. It is understood that performance of the all pass network changes based on the input impedance. For example, at 25 Ohms the effective bandwidth for a ninety degree phase relation between the legs may be about 3-9 GHz. In one embodiment, the bandwidth can be dynamically adjusted by modifying the line impedance.

It understood that impedance values for the all pass network 300 components can vary to meet the needs of a particular application. Exemplary component values for the all pass network of FIG. 3 are set forth below:

L1=L2=0.4 nH
L3=L4=1.6 nH
L5=L6=1.0 nH
L7=L8=5.0 nH
C1=C2=0.041 pF
C3=C4=0.16 pF
C5=C6=0.108 pF
C7=C8=5.0 pF

It is understood that other network configurations of capacitive, inductive, and other elements will be readily apparent to one of ordinary skill in the art. It is further understood that additional capacitor-inductor networks can be cascaded to broaden the bandwidth.

Figure 4:
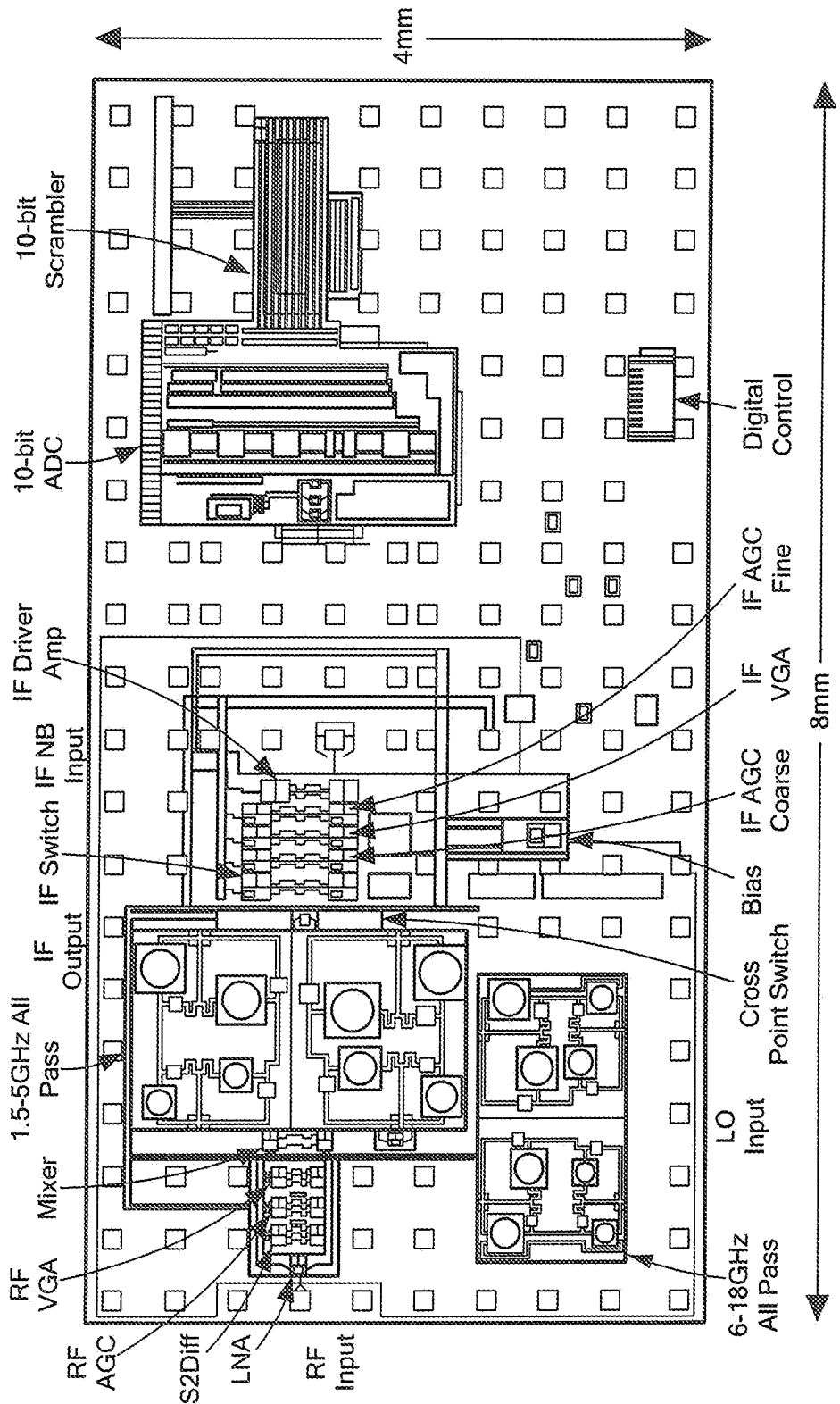
FIG. 4 is a schematic representation of an exemplary layout of a receiver-only implementation.

FIG. 4 shows an exemplary receiver-only chip layout for the circuit of FIG. 2 with illustrative dimensions of 8 mm×4 mm. It is understood that this layout may not be optimized for space and may be realized in smaller dimensions.

Figure 5:
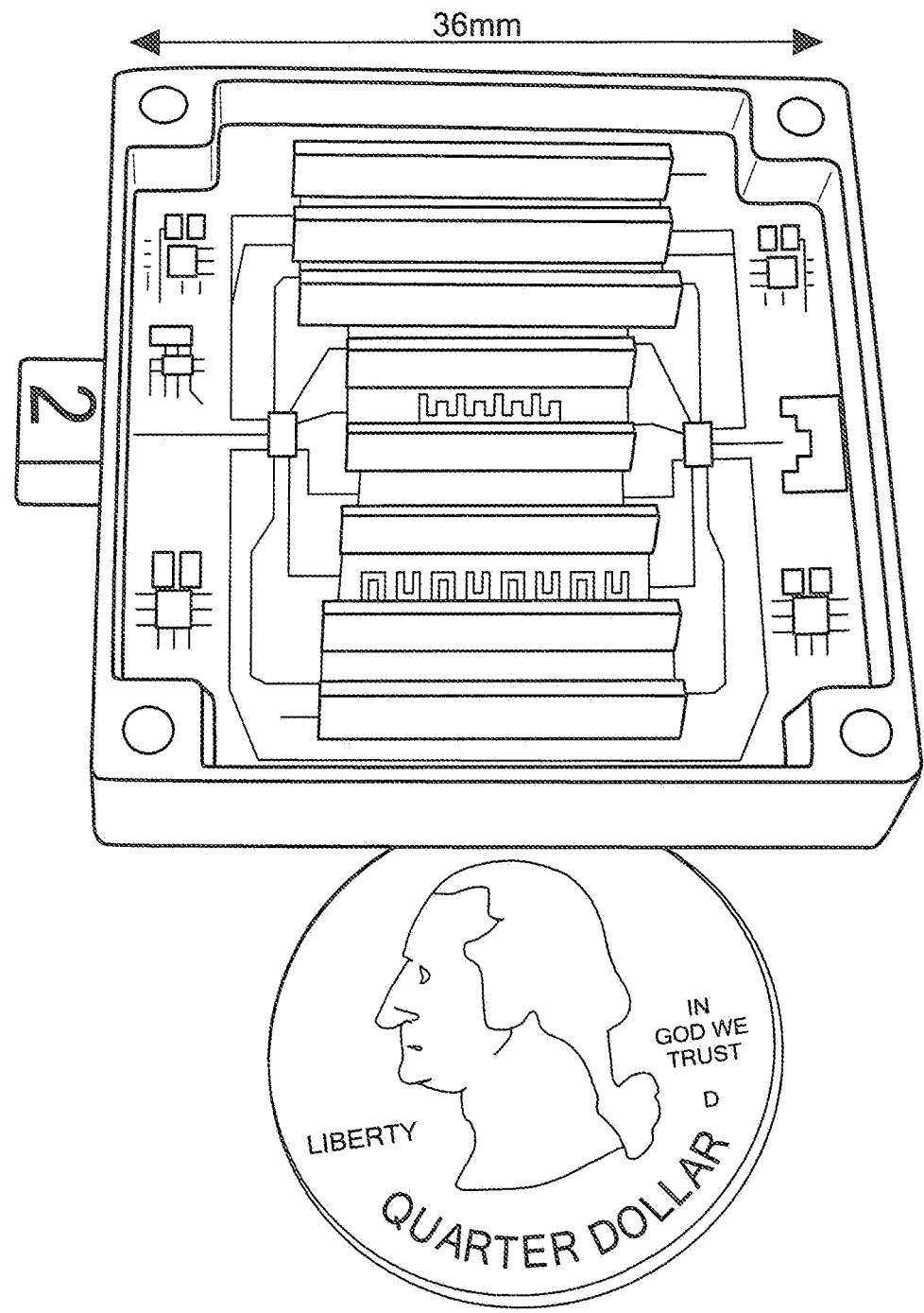
FIG. 5 is a pictorial representation of a filter bank shown in size relation to a U.S. quarter dollar.

FIG. 5 shows an exemplary switch filter bank in size relation to a U.S. quarter dollar coin. The significant amount of space required for a switch filter bank is readily apparent.

Figure 6:
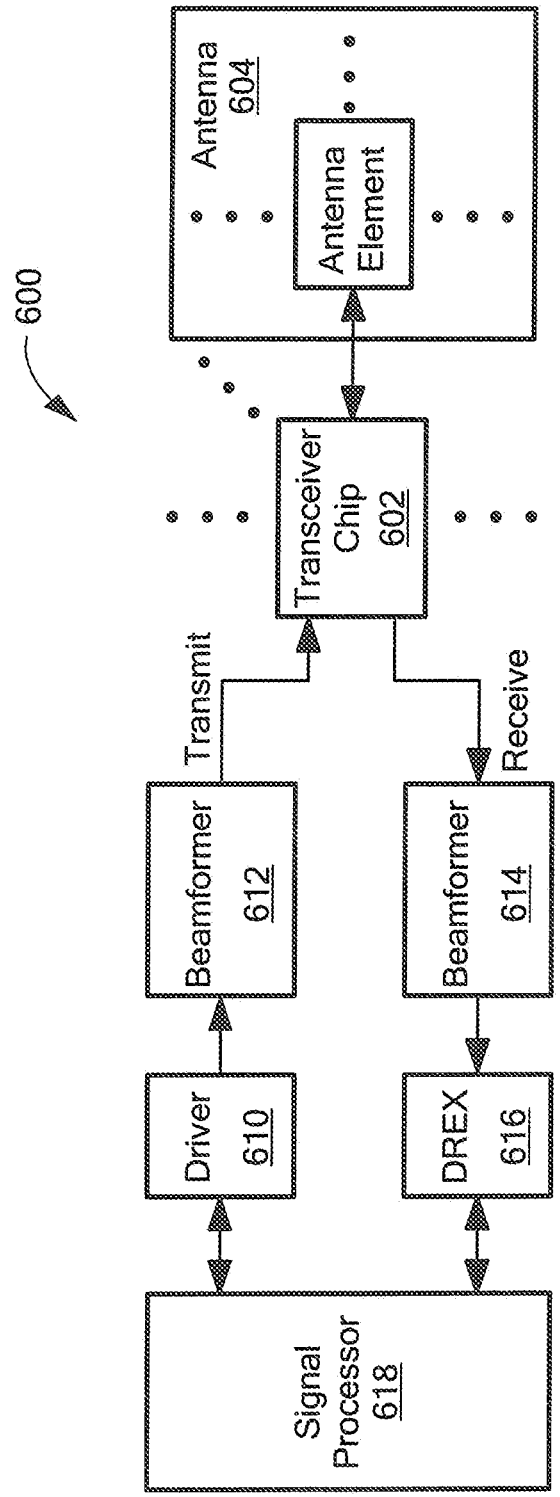
FIG. 6 is a schematic representation of a phased array radar system having a transceiver chip in accordance with exemplary embodiments of the invention.

FIG. 6 shows an exemplary phased array radar system 600 having transceiver chips in accordance with exemplary embodiments of the invention. One of ordinary skill in the art will appreciate the advantages of smaller transceiver chips 602 in a phased array antenna 604. For example, the more transceiver chips that are available, the greater the number of beams that can be formed by the antenna.

For the transmit path, a driver 610 is coupled to a beamformer module 612 that provides a signal to the transceiver chip 602 for transmission by an antenna element. For the receive path, the transceiver chip 602 receives a signal from the antenna element and provides the signal to a receive side beamformer 614. A digital receiver/exciter (DREX) 616 is coupled to the beamformer and to a signal processor module 618. Signal transmission, reception, and processing in a phased array radar are well known in the art.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims.

All publications and references cited herein are expressly incorporated herein by reference in their entirety.

What is claimed is:

1. A module, comprising:
   a monolithic integrated circuit forming a chip;
   a low noise amplifier having an output for amplified receive data;
   a first single sideband mixer disposed on the chip and coupled to the output of the low noise amplifier for downconverting the receive data, the first single sideband mixer comprising:
      first and second mixers;
      a first all pass network having an input to receive a local oscillator signal and first and second outputs to generate signals having a first phase difference, the first and second outputs coupled to the first and second mixers; and
      a second all pass network coupled to the first and second mixers to receive the downconverted receive data.

2. The module according to claim 1, wherein the first and second all pass networks are disposed on the chip.

3. The module according to claim 1, further including a second single sideband mixer disposed on the chip to upconvert transmit data.

4. The module according to claim 3, wherein the second single sideband mixer comprises the first all pass network in common with the first single sideband mixer, a third all pass network, and third and fourth mixers.

5. The module according to claim 4, wherein the third all pass network is disposed on the chip.

6. The module according to claim 5, wherein the second single sideband mixer is disposed on the chip.

7. The module according to claim 1, wherein the module operates as frequencies of over about 6 GHz.

8. The module according to claim 1, wherein the first phase difference is about ninety degrees.

9. The module according to claim 8, wherein the first phase difference is about ninety degrees within about plus/minus three degrees for a frequency range of about 6 GHz to about 18 GHz for an input impedance of about 50 Ohms.

10. The module according to claim 8, wherein the first phase difference is about ninety degrees over at least one octave.

11. The module according to claim 1, wherein the module forms part of a phased array radar.

12. The module according to claim 1, further including an off-chip filter bank coupled to a receiver input.

13. A module, comprising:
   amplifier means for low noise amplification of a receive signal; and
   a first single sideband mixer means for downconverting the receive signal from the amplifier means, the first single sideband mixer means comprising:
      a first all pass network means for receiving a local oscillator signal and providing a first phase difference;
      first and second mixer means coupled to the first all pass network means and the amplifier means; and
      a second all pass network means for receiving the downconverted receive data from the first and second mixer means,
   wherein the single sideband mixer is disposed on a chip.

14. The module according to claim 13, further including a second single sideband mixer means for upconverting transmit data.

15. The module according to claim 14, wherein the second single sideband mixer means and the third all pass network means are disposed on the chip.

16. The module according to claim 14, wherein the second single sideband mixer means includes third and fourth mixer means, the first all pass network means and a third all pass network means.

17. The module according to claim 14, wherein the first phase difference is about ninety degrees.

18. The module according to claim 17, wherein the first phase difference is about ninety degrees within about plus/minus three degrees for a frequency range of about 6 GHz to about 18 GHz for an input impedance of about 50 Ohms.

19. The module according to claim 18, wherein the first phase difference is about ninety degrees over at least one octave.

20. A method, comprising:
- employing a low noise amplifier having an output for amplified receive data;
- employing a first single sideband mixer disposed on the chip and coupled to the output of the low noise amplifier for downconverting the receive data, the first single sideband mixer comprising:
    - first and second mixers;
    - a first all pass network having an input to receive a local oscillator signal and first and second outputs to generate signals having a first phase difference, the first and second outputs coupled to the first and second mixers; and
    - a second all pass network coupled to the first and second mixers to receive the downconverted receive data,
- wherein the first single sideband mixer is disposed on a chip.

* * * * *